(12) United States Patent
Yoon

(10) Patent No.: US 7,470,418 B2
(45) Date of Patent: Dec. 30, 2008

(54) ULTRA-FINE FIBROUS CARBON AND PREPARATION METHOD THEREOF

(75) Inventor: Seong Ho Yoon, Daejeon (KR)

(73) Assignee: Nexen Nano Tech Co., Ltd. (KR)

( * ) Notice: Subject to any disclaimer, the term of this patent is extended or adjusted under 35 U.S.C. 154(b) by 460 days.

(21) Appl. No.: 10/531,710

(22) PCT Filed: Oct. 17, 2003

(86) PCT No.: PCT/KR03/02180

§ 371 (c)(1),
(2), (4) Date: Apr. 18, 2005

(87) PCT Pub. No.: WO2004/035882

PCT Pub. Date: Apr. 29, 2004

(65) Prior Publication Data

US 2006/0002842 A1    Jan. 5, 2006

(30) Foreign Application Priority Data

Oct. 17, 2002  (KR) ............... 10-2002-0063639
Oct. 17, 2002  (KR) ............... 10-2002-0063640

(51) Int. Cl.
D01F 9/12    (2006.01)
D01C 5/00    (2006.01)
C01B 31/04   (2006.01)
C01B 31/00   (2006.01)
C01B 31/02   (2006.01)
C01D 3/00    (2006.01)
D02G 3/00    (2006.01)
B32B 9/00    (2006.01)
B01J 23/00   (2006.01)

(52) U.S. Cl. .............. 423/447.2; 423/447.1; 423/447.3; 423/447.4; 423/447.5; 423/448; 423/449.1; 423/445 R; 428/364; 428/365; 428/367; 428/368; 502/314; 502/315; 502/316; 502/325

(58) Field of Classification Search .............. 423/447.1, 423/447.2

See application file for complete search history.

(56) References Cited

U.S. PATENT DOCUMENTS 5,458,784 A    10/1995  Baker et al. ................. 210/674

(Continued)

FOREIGN PATENT DOCUMENTS

JP    2001-019413    1/2001

(Continued)

OTHER PUBLICATIONS

Seong-Ho Yoon, Seongyop Lim, Seong-hwa Hong, Wenming Qiao, D. Duayne Witehurst, Isao Mochida, Bei An, Kiyoshi Yokogawa. A conceptual model for the structure of catalytically grown carbon nano-fibers. Apr. 7, 2005. Carbon 43: 1828-1838.*

(Continued)

*Primary Examiner*—Jerry Lorengo
*Assistant Examiner*—Jennifer A Smith
(74) *Attorney, Agent, or Firm*—Cantor Colburn LLP

(57) ABSTRACT

The present invention discloses ultra-fine fibrous carbon and preparation of the same. Specifically, the present ultra-fine fibrous carbon is characterized by the graphite-like structure with the $sp^2$ hybrid carbon content of more than 95% per total content; the (002) plane interlayer spacing ($d_{002}$, d-spacing of C(002) profiles determined by X-ray diffraction method) of 0.3370-0.3700 nm; the (002) plane stacking of more than 4 layers, namely the stacking height (Lc002) of more than 1.5 nm; fibrous carbon length per fibrous carbon width of diameter (aspect ratio) of more than 20; the average diameter of 5~50 nm.

4 Claims, 7 Drawing Sheets

U.S. PATENT DOCUMENTS

| | | | | |
|---|---|---|---|---|
| 6,156,256 | A | 12/2000 | Kennel | 264/461 |
| 6,183,714 | B1 * | 2/2001 | Smalley et al. | 423/447.3 |
| 7,048,904 | B2 * | 5/2006 | Yanagisawa et al. | 423/447.2 |
| 7,261,871 | B2 * | 8/2007 | Iyer et al. | 423/447.1 |
| 2002/0054849 | A1 * | 5/2002 | Baker et al. | 423/447.2 |
| 2002/0098135 | A1 * | 7/2002 | Smalley et al. | 422/198 |
| 2005/0260120 | A1 * | 11/2005 | Smalley et al. | 423/447.1 |
| 2006/0002842 | A1 * | 1/2006 | Yoon | 423/447.2 |
| 2006/0008408 | A1 * | 1/2006 | Yoon et al. | 423/447.2 |

FOREIGN PATENT DOCUMENTS

| | | |
|---|---|---|
| JP | 2001-98430 | 4/2001 |
| JP | 2002-105765 | 4/2002 |
| JP | 2002105765 A * | 4/2002 |

OTHER PUBLICATIONS

Kishinevsky et al. "Catalytic Transformation of Carbon Black to Carbon Nanotubes". Chemical Materials 2002, 14, 4498-4501.*

PCT International Search Report; International applicaton No. PCT/KR2003/002180; International filing date: Oct. 17, 2003; Date of Mailing: Feb. 16, 2004.

International Preliminary Examination Report; International application No. PCT/KR2003/002180; International filing date: Oct. 17, 2003; Date of Completion: Feb. 7, 2005.

* cited by examiner

ULTRA-FINE FIBROUS CARBON AND PREPARATION METHOD THEREOF

TECHNICAL FIELD

This invention relates to production of ultra-fine fibrous carbon and preparation method for the same. Specifically, the present ultra-fine fibrous carbon comprises more than 95% carbon atoms, which was designed for practical applications such as polymer composites, a catalyst support of fuel cells and organic reaction, a gas storage medium of hydrogen or methane, a electrode or conductor in lithium secondary battery and super EDLC (electric double layer capacitor), wherein the (002) plane interlayer spacing (d002, hereinafter) ranges 0.3370~0.3700 nm; the (002) plane stacking consists of more than 4 layers, namely the stacking height (Lc002, hereinafter) is more than 1.5 nm; fibrous carbon length per fibrous carbon width or diameter (aspect ratio, hereinafter) is more than 20; the average diameter ranged 5~50 nm; and there is no continuous hollow core therein.

BACKGROUND ART

Several patents or papers have been reported on filamentous nano-carbon (carbon nanofiber or graphite nanofiber) and its preparation. For examples, Exxon Research and Engineering Co. (USA) disclosed production of carbon filaments by dissociating a carbon-containing gas such as carbon monoxide, acetylene, etc. at a temperature to about 800° C. in the presence of iron monoxide or iron (U.S. Pat. No. 4,565,683). Also, Hyperion Catalytic International Inc. (USA) disclosed the multi-walled carbon nanotube, which is characterized by a cylindrical shape, a hollow core, the aspect ratio of more than 5, an ordered outer region of multiple, and substantially continuous 8~15 layers of ordered carbon atoms having an outside diameter between about 10 and 15 nanometers which are catalytically grown from a gaseous carbon-containing compound (Japan Patent No. 62-5000943).

Baker and Rodriguez (U.S. Pat. No. 6,099,960; High surface area nanofibers, methods of making, methods of using and products containing same) disclosed preparation of carbon nanofibers with 50~800 $m^2/g$ surface areas through catalytic pyrolysis of several hydrocarbons over catalysts such as iron, nickel, and cobalt at 500~700° C. Boehm (Boehm, *Carbon*, 11, 583 (1973)), Murayama (H. Murayama and T. Maeda, *Nature*, 245, 791), and Rodriguez (N. M. Rodriguez, *J. Mater. Res.* 8: 3233 (1993)) reported preparation of filamentous nanocarbons or carbon nanofibers through catalytic pyrolysis over alloys of iron, cobalt, and nickel.

Since report on carbon nanotube and its preparation (S. Iijima, *Nature*, 354, 56 (1991)), a number of studies on preparation and application of carbon nanofiber or filamentous nanocarbons have been performed in the last decade. Carbon nanotube is a nano-sized fibrous carbon of cylindrical shape with a hollow core of more than 0.4 nm, wherein the hexagonal planes align parallel to the fiber axis. Carbon nanotube is classified as multi-walled carbon nanotube (MWCNT, concentric stacking of multi layers) and single walled carbon nanotube (SWCNT, only one layer). SWCNT has 0.4~5 nm diameters, and the outer diameter of MWCNT ranges 2.5~50 nm.

Comparing to the carbon nanotube, filamentous nanocarbons or carbon nanofibers have the carbon hexagonal planes stacking perpendicular to the fiber axis (columnar or platelet structure, see FIG. 7) and angled to the fiber axis (herring bone or feather structure, see FIG. 8, ref.) Rodriguez, N. M. 1993. *J. Mater. Res.* 8: 3233). Carbon nanofibers have no continuous hollow core, differing from carbon nanotube. Such carbon nanofibers have been synthesized by catalytic pyrolysis of hydrocarbons or carbon monoxide over VIII metals such as Fe, Co, and Ni as main catalysts.

Carbon nanofibers or filamentous nanocarbons in practical applications have attracted attention no more than as a substitute for carbon black, whereas carbon nanotubes, which are characterized by the diameter of several or several tens nanometers, are expected for many applications: for examples, conductive pigments or composites especially with transparency; the field emission; nano-electronics; hydrogen storage; and biotech-relating applications.

Such a low potential of carbon nanofibers may be originated from relatively large diameters of more than 100 nm, actually further 300 nm in many fibrous carbons, for which the transparency to visible light can be never expected in solvent or composite containing even less than 1 wt % of them; and for which the conductivity in composites is inferior to carbon blacks due to inferior contact property. Generally, the transparency to visible light can be attained when the particle size or diameter is controlled below 100 nm, preferentially 80 nm. Carbon nanofibers so far have a wide distribution of diameters, furthermore thicker average diameters than 100 nm as above-mentioned. Hence, many advantages arising from a nano-size such as transparency cannot be expected, and it is difficult to homogeneously control the properties in their practical applications.

Although there are many problems relating to carbon nanofiber and its application as aforementioned, carbon nanofibers or filamentous nanocarbons are characterized by the superior productivity, which is several or several tens times higher than that of carbon nanotube, depending on preparation methods. Such high yield results in low prices. Also, superior properties of carbon nanofibers have been reported in some applications, especially hydrogen storage: for examples, Baker and Rodriguez reported a marvelous result of 40~63 wt % hydrogen storage (U.S. Pat. No. 6,159, 538). Although such a surprising result has been proved not to be reproducible (USA DOE Report, IEA Task 12: Metal Hydride and carbon for Hydrogen Storage 2001, Project No. C-3-Leader: Richard Chahine (Canada), Assessment of Hydrogen Storage on Different Carbons), the same report or other papers suggests that carbon nanofibers are capable of hydrogen storage about 2 times more than active carbons under 10 MPa (R. Stroebel, et al., *J. Power Sources*, 84, 221(1999)).

Moreover, carbon nanofibers or filamentous nanocarbons produced over non-supported catalysts are advantageous in terms of prices, as they never need burdensome and high cost purification.

DISCLOSURE OF THE INVENTION

The present invention was designed to solve the problems of conventional carbon nanofibers as described above, and specifically the purpose of this invention is to provide a filamentous carbon or fibrous carbon with very small diameters to be used for various fields such as pigments, inks, films, coating materials, and composites, especially with transparency.

Further, the present invention purposed to provide a high yield preparation of the ultra-fine fibrous carbon to be used as a high-efficient material for overall industry, for examples, a gas storage medium for hydrogen or methane, a catalyst support of fuel cells and an electrode or conductor of Li secondary battery and super EDLC.

To achieve the aforementioned purposes, this invention discloses the ultra-fine fibrous carbon, wherein (1) the fibrous carbon contains more than 95 wt % carbon; (2) the fibrous carbon diameters range from 3.5 to 79.9 nm; (3) the aspect ratio (fiber length per fiber diameter, no dimension) is more than 20, and the carbon hexagonal planes align angled to the fiber axis, where the angle between the hexagonal plane and the fiber axis is 90° or 5~65°.

Further, the ultra-fine fibrous carbon of the present invention is characterized by preparation of the fibrous carbon over carbon black-supported metal mixture or alloy catalysts, wherein the metal mixtures or alloys involve nickel, nickel-iron and nickel-molybdenum; the carbon black is characterized by less than 100 $m^2$/g BET-surface area, 20~60 nm particle size, and more than 10 wt % oxygen content; the carbon black-supported catalyst contains 0.1~60 wt % metal mixture or alloy per carbon black; and the ultra-fine fibrous carbon is prepared by introducing carbon source at the flow rate of 0.5~40 sccm (standard cc per minute) per 1 mg catalyst in the furnace for prescribed time, where the carbon source involves C2~C6 hydrocarbons or mixtures of C2~C6 hydrocarbons and hydrogen.

Also, the ultra-fine fibrous carbon of the present invention is characterized by preparation of the fibrous carbon over carbon black-free metal mixture or alloy catalysts, wherein the carbon black-free catalysts are prepared through preparation of carbon black-supported metal mixtures or alloys as above-described, removal of carbon black from the carbon black-supported metal mixtures or alloys by oxidation at 300~500° C. in 5~40 v/v % oxidative gases such as oxygen or carbon dioxide in inert gases such as nitrogen, argon or helium, and reduction in 1~3 times in gas mixtures of 5~40 v/v % hydrogen in nitrogen, argon or helium at 400~500° C. for 1~48 h.

BEST MODE FOR CARRYING OUT THE INVENTION

Figure 1:
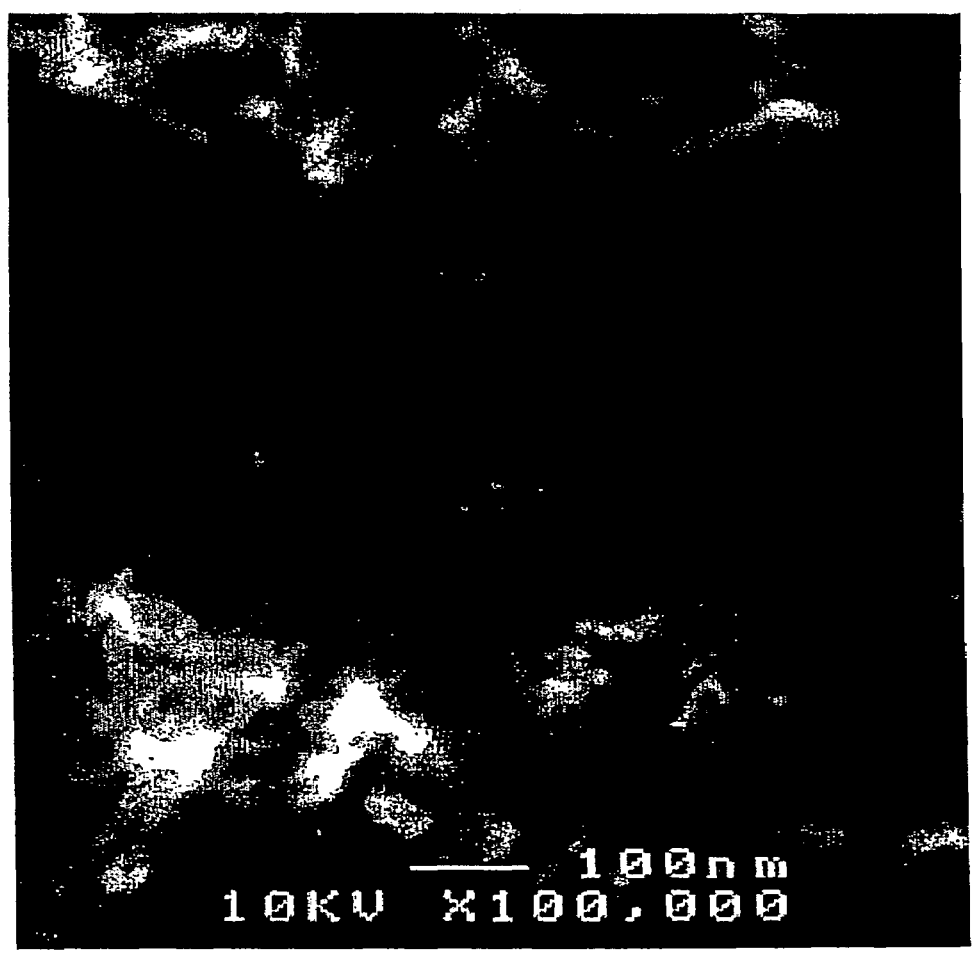
FIGS. 1 and 2 illustrate HR-SEM and HR-TEM photographs of the present ultra-fine fibrous carbons produced in Example 1.

The ultra-fine fibrous carbon and preparation method thereof according to the present invention will now be described in detail through general preparation process followed by description of the respective examples.

Generally, filamentous nanocarbons are obtained by growing carbon from decomposition of gas-phase compounds at high temperatures over metal or alloy catalysts. Hence, synthesis of filamentous nanocarbons comprises two steps: catalyst preparation and synthesis over the catalyst. The catalyst mainly involves several transition metals such as iron, nickel and cobalt, and their alloys. Synthesis of filamentous nanocarbons is affected by critical factors such as the kind and partial pressure of carbon sources, and the reaction temperature.

High dispersion of active metals or alloys on supports is attained by particular interaction or ion exchange between metal compounds and oxygen or heteroatoms on the supports. A representative example is dispersion and reduction of iron nitrate or acetate on alumina. Carbon nanofibers produced over alumina-supported catalysts can be practically used for applications after removal of alumina of generally more than 100 μm sizes from the product, generally by long time treatment with very strong acids or heat treatment at more than 2800° C. Actually, the removal of alumina is a very difficult step in real processes.

In this invention, carbon blacks, which are similar in the structure and properties with filamentous nanocarbons, are used as a catalyst support, especially a carbon black with amorphous coagulum, small primary particle size (around 20 nm), and around 15 w % oxygen content.

More particularly, the catalyst for ultra-fine fibrous carbon in this invention comprises nickel as a major catalyst which shows a strong activity to ethylene, propylene, acetylene, etc below 700° C., whereas iron or molybdenum, which are inactive in the above-described condition, are used as secondary metals to disperse nickel particles in the form of alloys or mixtures.

In catalyst preparation of nickel and iron dispersing uniformly on carbon black, the aqueous solution of corresponding nitrates or acetates is impregnated into a particular carbon black of low graphitization and more than 10% oxygen content, wherein the content of nickel or nickel-iron components ranges 0.1~60 wt % per carbon black, preferably 1~30 wt %.

Carbon black-supported catalysts as described above are used as two forms such as (1) carbon black-supported catalysts as-prepared (CB-supported catalysts, hereafter) and (2) carbon black-free catalysts (CB-free catalysts, hereafter) to produce ultra-fine fibrous carbon in this invention, wherein the CB-free catalysts contain carbon black content of less than 1 wt %.

In preparation of the CB-free catalysts, the carbon black removal from the aforementioned CB-supported catalysts such as CB-supported Ni or Ni—Fe is performed in air or gas mixtures of inert gases such as nitrogen, argon or helium and oxidative gases such as oxygen and carbon dioxide, where the oxidative gas content ranges 5~40 v/v %, preferably 10~30 v/v %, at 300~550° C., preferably 450~500° C., consequently to provide Ni or Ni—Fe oxide particles containing less than 1 wt % carbon black, wherein the oxide particles are finer than those by conventional coprecipitation.

In use of CB-supported catalysts in this invention, ultra-fine fibrous carbons are produced as follows: (1) scattering the above-prepared CB-supported catalysts on an alumina or quartz tray; (2) reducing the catalyst into active one in a conventional furnace under 5~40 v/v % hydrogen, preferably 8~30% in inert gases such as nitrogen, argon or helium at 400~520° C., preferably 450~500° C. for 1~48 h, preferably 1.5~24 h by 1~3 times, preferably 1~2 times repeatedly; (3) introducing carbon source at the flow rate of 0.5~40 sccm preferably 1~1 0 sccm per 1 mg catalyst in the furnace at prescribed time for prescribed time, wherein the carbon source involves saturated or unsaturated hydrocarbons containing 2~5 carbon atoms, preferably containing 2~4 carbon atoms, such as ethylene, acetylene and propane or mixtures of aforementioned hydrocarbons and hydrogen, wherein hydrogen partial pressure in the carbon source ranges suitably 0~80 v/v %, wherein the reaction condition is adjusted at 300~499° C., preferably 350~490° C. for 2 min~12 h, preferably 20 min~4 h.

In use of CB-free catalysts in this invention, ultra-fine fibrous carbons are produced as follows: (1) scattering the above-prepared CB-free oxides on an alumina or quartz tray; (2) reducing the oxides into active catalysts in a conventional furnace under 5~40 v/v % hydrogen, preferably 8~30 v/v % in inert gases such as nitrogen, argon or helium at 400~520° C., preferably 450~500° C. for 1~48 h, preferably 1.5~24 h by 1~3 times, preferably 1~2 times repeatedly; (3) introducing carbon source at the flow rate of 0.5~40 sccm, preferably 1~10 sccm per 1 mg catalyst at prescribed time in the furnace for prescribed time, wherein the carbon source involves saturated or unsaturated hydrocarbons containing 2~5 carbon atoms, preferably containing 2~4 carbon atoms, such as ethylene, acetylene and propane or mixtures of aforementioned hydrocarbons and hydrogen, wherein hydrogen partial pressure in the carbon source ranges suitably 0~80 v/v %, wherein the reaction condition is adjusted at 300~499° C., preferably 350~490° C. for 2 min~12 h, preferably 20 min~4 h.

Through hydrogen reduction, metal nitrates or acetates dispersed on CB further experience multi-step segregation into very fine catalyst particles on CB, providing ultra-fine fibrous carbons. However, higher temperatures than 520° C. induce aggregation of such fine particles, leading the diameters of fibrous carbons to more than 80 nm. In this aspect, the present invention was significantly designed to provide ultra-fine fibrous carbons of less than 50 nm diameters through (1) dispersing catalyst particles on a suitable CB, and (2) suppressing maximally the aggregation of fine particles segregated through suitable reduction.

Also, CB-free oxides are finer than the oxides by conventional coprecipitation. Hence, suitable segregation during hydrogen reduction may provide fine active catalysts for production of fibrous carbons. As similar as in CB-supported catalysts, higher temperatures than 520° C. induce particle aggregation and consequently thick fiber of more than 80 nm diameters. Therefore, the present invention was delicately designed to provide ultra-fine fibrous carbons containing no CB or in a high purity through (1) preparation of fine catalyst particles by removing CB from CB-supported catalysts under a suitable condition, and (2) suppressing maximally the aggregation of fine particles segregated through suitable reduction.

This invention is illustrated in the examples and comparative examples which follow. The examples or comparative examples are set forth to aid in an understanding of the invention but are not intended to, and should not be construed to, limit in any way the invention as set forth in the claims which follow thereafter. In all examples and comparative examples which follow, the symbol '%' means weight percentage if there are no description.

EXAMPLES

Example 1

The following materials used in the examples below may be obtained from commercial sources: iron nitrate (iron(III) nitrate nonahydrate $Fe(NO_3)_3 \cdot 9H_2O$=404.00 (99%, Wako), a product (No. 3050) from Mitsubishi Chemical Co., Japan. Detailed properties of CB are shown in Table 1.

CB-supported Fe/Ni mixture or alloy (1/4 w/w) catalyst was prepared as follows. The mixture of 29.0 g iron nitrate and 5.0 g nickel nitrate was dissolved in 200 ml distilled water, and then CB (Table 1) 80 g was added to the solution, the mixture being stirred for 30 min. The slurry was dried in a rotary evaporator at 80° C. under 40 torr, providing a CB-supported Fe/Ni (1/4) catalyst (5% metal content per CB).

CB-supported Fe/Ni(1/4) as prepared above (110 mg) was dispersed in a quartz tray (length:width:depth=100:25:15/ mm (outer)), and then the tray was placed in the middle of a quartz tube (45 mm inner diameter), which was equipped with a conventional furnace. After He flow at ambient temperature for 30 min, the gas mixture of 100 sccm hydrogen/ helium (20% hydrogen partial pressure) was introduced at 480° C. for 2 h, and then the reaction was performed under 200 sccm gas flow composed of a 75:25 ethylene:hydrogen (v/v) mixture at 480° C. for 2 h, providing 710 mg product involving fibrous carbons and CBs.

Table 2 shows d002, Lc(002), and the surface areas of the fibrous carbons produced in corresponding examples. Graphitization properties of the fibrous carbons were analyzed in X-ray diffraction (Rigaku Geigerflex II; CuKα, 40 KV, 30 mA, Stepwise Method) at 2θ 5~90°. From the diffraction, the average (002) plane interlayer spacing (d002, hereinafter) and the average stacking height of (002) planes (Lc (002), hereinafter) were obtained according to the JSPS procedure (Otani Sugio, et al. Carbon Fibers. Nihon Kindaihensyusya; Tokyo, 1983). The surface areas of the fibrous carbons were calculated by using the Dubinin equation.

Figure 2:
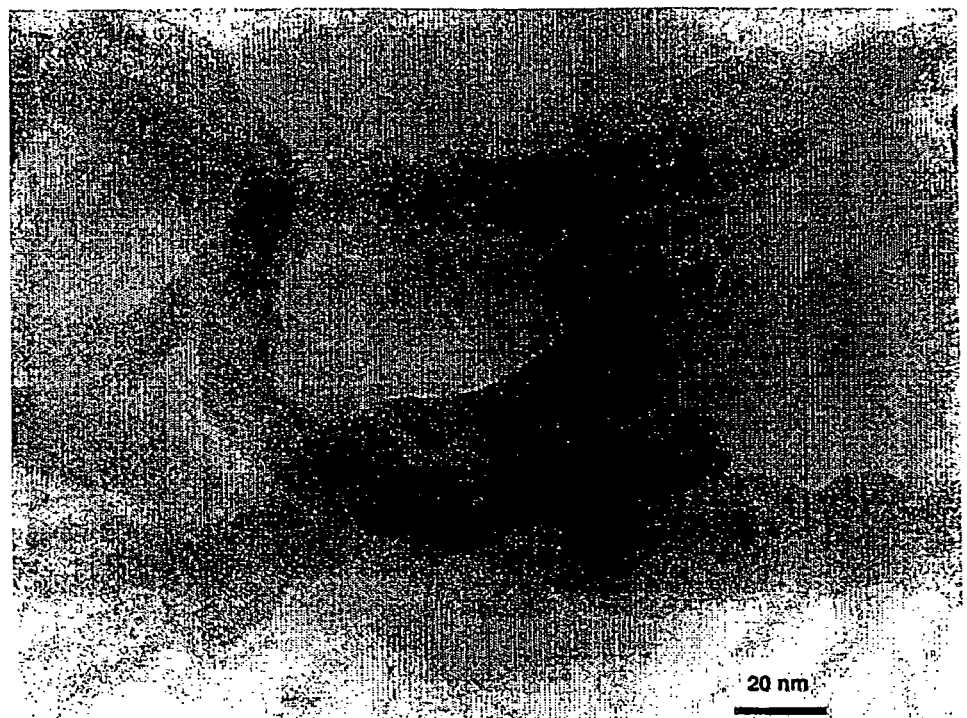

The morphology and structure of ultra-fine fibrous carbons produced above were examined under a high resolution scanning electron microscope (HR-SEM, Jeol, JSM 6403F) and a transmission electron microscope (TEM, Jeol, JEM 100CX) as shown in FIGS. 1 and 2.

The fibrous carbon as prepared above shows a feather structure wherein the hexagonal planes align angled to the fibrous carbon axis (the angle 45~80°), distinct from carbon nanotube of which the hexagonal planes align parallel to the fiber axis with a continuous hollow core.

The average diameters or widths of the fibrous carbons were measured by observation of 320 million magnified images through TEM monitor in random selection of 500 fibrous carbons. The average diameter of the fibrous carbon produced above was 22.5 nm, and 75% of fibrous carbons ranged 12~32 nm diameters. CB which is the catalyst support is a little observed under SEM, but hardly under TEM. The aspect ratio of the fibrous carbon produced above was more than 30.

TABLE 1

| | | | Properties of carbon black as described in 'Materials' | | | | | |
|---|---|---|---|---|---|---|---|---|
| Particle Size | BET. Surface Area | Tinting Strength | DBF Absorption ($cm^3$/100 g) | | Volatile Content | PH | Blackness of PVC | Oxygen Content |
| (nm) | ($m^2$/g) | (%) | Powder | Beads | (%) | Value | Resin | (wt %) |
| 30 | 48 | 66 | — | 175 | 0.5 | 7.0 | 0.20 | 15.2 | mp 35~40° C., d 1.684, sol in water, ethanol, acetone), and nickel nitrate (nickel (II) nitrate hexahydrate $Ni(NO_3)_2 \cdot 6H_2O$=290.79 (98%, Wako), mp 56.7° C., d 2.05, bp 137, sol in 0.4 part water, in alcohol, Ni content 20.19% (Nickel Ni=58.71)) may all be obtained from Wako Co. (Japan). Carbon black (CB, hereinafter) used in the examples below is Examples 2 to 21 below illustrate production of ultra-fine fibrous carbons under the same or different conditions over the same or different catalysts, and average diameters, $d_{002}$, Lc(002), and surface areas of fibrous carbons produced in corresponding Examples or Comparative examples are summarized in Tables 2 and 3.

Example 2

Catalyst prepared as in Example 1 (115 mg) was set in the furnace as described in Example 1. After He flow at ambient temperature for 30 min, the gas mixture of 100 sccm hydrogen/helium (20% hydrogen partial pressure) was introduced at 480° C. for 2 h, and then the reaction was performed under 200 sccm gas flow composed of a 75:25 ethylene:hydrogen (v/v) mixture at 400° C. for 2 h, providing 465 mg product involving fibrous carbons and CBs.

The d002, Lc(002), surface areas, and average diameters of fibrous carbons produced above were measured by the methods described in Example 1 (Table 2). The aspect ratio of the fibrous carbon produced above was more than 30.

The fibrous carbon as prepared above shows a columnar structure wherein the hexagonal planes align perpendicular to the fibrous carbon axis, certainly differing from carbon nanotube of which the hexagonal planes align parallel to the fiber axis with a continuous hollow core.

Example 3 and 4

Catalyst prepared as in Example 1 was set in the furnace as described in Example 1. After He flow at ambient temperature for 30 min, the gas mixture of 100 ml/min hydrogen/helium (20% hydrogen partial pressure) was introduced at 480° C. for 2 h, and then the reaction was performed under 200 ml/min gas flow composed of a 75:25 ethylene:hydrogen (v/v) mixture at 350° C. for 2 h (Example 3) and at 320° C. for 2 h (Example 4), providing 402 mg and 234 mg product, respectively, involving fibrous carbons and CBs.

The d002, Lc(002), surface areas, and average diameters of fibrous carbons produced above were measured by the methods described in Example 1 (Table 2). The aspect ratio of the fibrous carbon produced above in both cases was more than 30.

The structure of fibrous carbon produced above was similar as in Example 2.

Example 5

To prepare a CB-free catalyst, catalyst as in Example 1 (1080 mg) was dispersed in a quartz tray (length:width:depth=100:25:15/mm (outer)), and then the tray was placed in the middle of a quartz tube (45 mm inner diameter), which was equipped with a conventional furnace. CB combustion from catalyst as in Example 1 was performed in dry air at 100 sccm flow rate composed of 20 v/v % oxygen and 80 v/v % nitrogen at 480° C. for 2 h, providing 115 mg of a Fe/Ni(1/4) oxide containing less than 1.0 wt % CB content.

The average particle size of Fe/Ni(1/4) oxide as prepared above was 8.4 nm in TEM observation.

Fe/Ni(1/4) oxide as prepared above (30 mg) was set in the furnace as described in Example 1. After He flow at ambient temperature for 30 min, the gas mixture of 100 sccm hydrogen/helium (20% hydrogen partial pressure) was introduced at 480° C. for 2 h, and then the reaction was performed under 200 sccm gas flow composed of a 75:25 ethylene:hydrogen (v/v) mixture at 480° C. for 2 h, providing 3120 mg fibrous carbons free from CBs.

The d002, Lc(002), surface areas, and average diameters of fibrous carbons produced above were measured by the methods described in Example 1 (Table 2). The fibrous carbon as prepared above shows a feather structure wherein the hexagonal planes align angled to the fibrous carbon axis (the angle 45~80°), similar as in Example 1 but distinct from carbon nanotube as described above. The average diameters of fibrous carbons produced above were 25.7 nm, and the aspect ratio of the fibrous carbon produced above was more than 30.

Example 6

Catalyst and reduction condition were the same as in Example 5, but the reaction was performed under 200 ml/min gas flow composed of a 75:25 ethylene:hydrogen (v/v) mixture at 300° C. for 2 h, providing 398 mg fibrous carbons free from CBs.

The d002, Lc(002), surface areas, and average diameters of fibrous carbons produced above were measured by the methods described in Example 1 (Table 2). The structure of fibrous carbon produced above was similar as in Example 2. The average diameters of fibrous carbons produced above were 15.7 nm, and the aspect ratio of the fibrous carbon produced above was more than 30.

Example 7

Catalyst prepared as in Example 5 was set in the furnace as described in Example 1. After He flow at ambient temperature for 30 min, the gas mixture of 100 sccm hydrogen/helium (20% hydrogen partial pressure) was introduced at 480° C. for 8 h, and then the reaction was the same as in Example 5, providing 2980 mg fibrous carbons free from CBs.

The d002, Lc(002), surface areas, and average diameters of fibrous carbons produced above were measured by the methods described in Example 1 (Table 2). The structure of fibrous carbon produced above was similar as in Example 5. The aspect ratio of the fibrous carbon produced above was more than 30.

Example 8

CB-supported Ni/Mo (4/1 w/w) was prepared from nickel nitrate (nickel (II) nitrate hexahydrate $Ni(NO_3)_2 \cdot 6H_2O$=290.79 (98%, Wako), mp 56.7° C., d 2.05, bp 137, sol in 0.4 part water, in alcohol, Ni content 20.19%) and ammonium molybdate (hexaammonium heptamolybdate tetrahydrate $(NH_4)_6Mo_7O24(4H2O$=1235.86 (99.0%), sol in water, insol in alcohol) according to the preparation procedure as described in Example 1. Metal content was 5% in CB-supported Ni/Mo (4/1).

CB-supported Ni/Mo (4/1) as prepared above (117 mg) was set in the furnace as described in Example 1. After He flow at ambient temperature for 30 min, the gas mixture of 100 sccm hydrogen/helium (20% hydrogen partial pressure) was introduced at 480° C. for 2 h, and then the reaction was performed under 200 sccm gas flow composed of a 50:50 ethylene:hydrogen (v/v) mixture at 480° C. for 2 h, providing 845 mg product involving fibrous carbons and CBs.

The d002, Lc(002), surface areas, and average diameters of fibrous carbons produced above were measured by the methods described in Example 1 (Table 2). The fibrous carbon as prepared above shows a feather structure wherein the hexagonal planes align angled to the fibrous carbon axis (the angle 45~80°), but distinct from carbon nanotube as described above. The average diameters of fibrous carbons produced above were 40.3 nm, and the aspect ratio of the fibrous carbon produced above was more than 30.

Example 9

To prepare a CB-free catalyst, catalyst as in Example 8 (117 mg) was set in the furnace as described in Example 1. CB from catalyst as in Example 8 was combusted in dry air at 100 sccm flow rate composed of 20 v/v % oxygen and 80 v/v % nitrogen at 400° C. for 5 h, and successively helium was flowed for 30 min before the hydrogen reduction for 1 h at 480° C. in the gas mixture of 100 sccm hydrogen/helium (20% hydrogen partial pressure), providing a CB-free Ni/Mo (4/1) catalyst.

CB-free Ni/Mo (4/1) as prepared above (30 mg) was set in the furnace as described in Example 1. After He flow at ambient temperature for 30 min, the gas mixture of 100 sccm hydrogen/helium (20% hydrogen partial pressure) was introduced at 480° C. for 2 h, and then the reaction was performed under 200 sccm gas flow composed of a 50:50 ethylene:hydrogen (v/v) mixture at 480° C. for 2 h, providing 3120 mg fibrous carbons free from CBs.

The d002, Lc(002), surface areas, and average diameters of fibrous carbons produced above were measured by the methods described in Example 1 (Table 2). The fibrous carbon as prepared above shows a feather structure wherein the hexagonal planes align angled to the fibrous carbon axis (the angle 45~80°), similar as in Example 5 but distinct from carbon nanotube as described above. The average diameters of fibrous carbons produced above were 43.1 nm, and the aspect ratio of the fibrous carbon produced above was more than 30.

Example 10

CB-supported Fe/Ni (3/2 w/w) was prepared from iron and nickel nitrates according to the preparation procedure as described in Example 1 Metal content was 5% in CB-supported Fe/Ni (3/2).

CB-supported Fe/Ni (3/2) as prepared above was set in the furnace as described in Example 1. After He flow at ambient temperature for 30 min, the catalyst was reduced in the gas mixture of 100 sccm hydrogen/helium (10% hydrogen partial pressure) at 480° C. for 20 h. After cooling down to ambient temperature, passivation of the reduced catalyst was performed by exposure to 2 v/v % oxygen in helium (flow rate 100 sccm) for 30 min, providing a reduced CB-supported Fe/Ni (3/2).

Reduced CB-supported Fe/Ni (3/2) as prepared above (116 mg) was set in the furnace as described in Example 1. After He flow at ambient temperature for 30 min, the gas mixture of 100 sccm hydrogen/helium (20% hydrogen partial pressure) was introduced at 480° C. for 2 h, and then the reaction was performed under 200 sccm gas flow composed of a 75:25 ethylene:hydrogen (v/v) mixture at 480° C. for 2 h, providing 468 mg product involving fibrous carbons and CBs.

The d002, Lc(002), and surface areas of fibrous carbons produced above were measured by the methods described in Example 1 (Table 2). The fibrous carbon as prepared above shows a feather structure wherein the hexagonal planes align angled to the fibrous carbon axis (the angle 45~80°), similar as Examples 1, 5, 8, and 9, but distinct from carbon nanotube as described above. The average diameters or widths of the fibrous carbons were measured by observation of 320 million magnified images through TEM monitor in random selection of 500 fibrous carbons. The average diameter of the fibrous carbon produced above was 33.4 nm, and 75% of fibrous carbons ranged 23~33 nm diameters. The aspect ratio of the fibrous carbon produced above was more than 30.

TABLE 2

| | X-ray diffraction properties | | $N_2$ BET | Average |
|---|---|---|---|---|
| | $d_{002}$ (nm) | Lc(002) (nm) | surface area ($m^2/g$) | diameter (nm) |
| Example 1 | 0.3423 | 2.4 | 262 | 22.5 |
| Example 2 | 0.3439 | 2.2 | 270 | 22.4 |
| Example 3 | 0.3522 | 1.8 | 314 | 15.7 |
| Example 4 | 0.3537 | 1.7 | 335 | 12.6 |
| Example 5 | 0.3543 | 1.7 | 390 | 25.7 |
| Example 6 | 0.3414 | 2.6 | 180 | 15.7 |
| Example 7 | 0.3430 | 2.1 | 244 | 21.4 |
| Example 8 | 0.3402 | 3.2 | 203 | 40.3 |
| Example 9 | 0.3405 | 3.4 | 231 | 43.1 |
| Example 10 | 0.3445 | 3.2 | 180 | 33.4 |
| C-example* 1 | 0.3414 | 5.2 | 94 | 140.3 |
| C-example 2 | — | — | — | — |
| C-example 3 | 0.3456 | 4.8 | 140 | 164.4 |
| C-example 4 | 0.3461 | 5.6 | 122 | 130.8 |
| C-example 5 | 0.3391 | 12.2 | 80.3 | 150.6 |

*C-example is the abbreviation of 'Comparative example'.

Example 11

Catalyst as in Example 1 was set in the furnace as described in Example 1. CB from catalyst as in Example 1 was combusted in dry air at 100 sccm flow rate composed of 20 v/v % oxygen and 80 v/v % nitrogen at 400° C. for 5 h, providing a Fe/Ni(1/4) oxide containing less than 1.0 wt % CB content.

After He flow at ambient temperature for 30 min, Fe/Ni (1/4) oxide as prepared above was reduced in the gas mixture of 100 sccm hydrogen/helium (20% hydrogen partial pressure) at 480° C. for 1 h. After cooling down to ambient temperature, passivation was performed by exposure to 2 v/v % oxygen in helium (flow rate 100 sccm) for 30 min, providing a Fe/Ni (1/4) alloy.

Fe/Ni (1/4) alloy as prepared above (30 mg) was set in the furnace as described in Example 1. After He flow at ambient temperature for 30 min, the gas mixture of 100 sccm hydrogen/helium (20% hydrogen partial pressure) was introduced at 480° C. for 2 h, and then the reaction was performed under 200 sccm gas flow composed of a 75:25 ethylene:hydrogen (v/v) mixture at 480° C. for 2 h, providing 5224 mg fibrous carbons free from CBs.

Figure 3A:
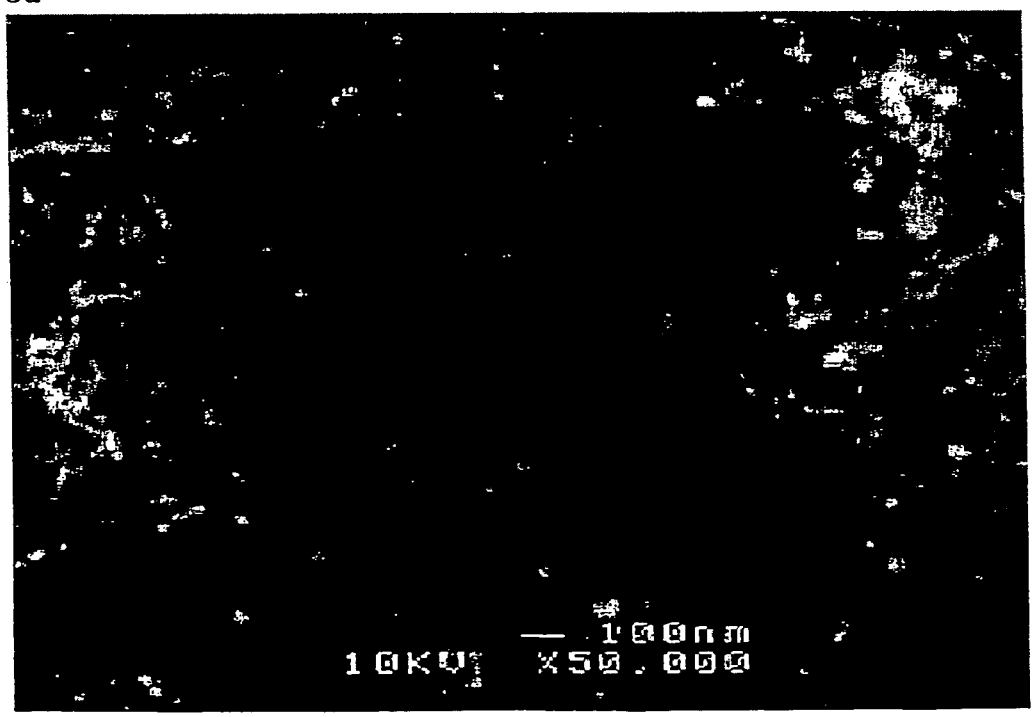
FIGS. 3a, 3b and 4 illustrate HR-SEM and HR-TEM photographs of the present ultra-fine fibrous carbons produced in Example 11.
Figure 3B:
Figure 4:

The d002, Lc(002), surface areas, and average diameters of fibrous carbons produced above were measured by the methods described in Example 1 (Table 3). The structure of fibrous carbon produced above was a feather type as shown in FIGS. 3a, 3b and 4.

The average diameters or widths of the fibrous carbons were measured by observation of 320 million magnified images through TEM monitor in random selection of 500 fibrous carbons. The average diameter of the fibrous carbon produced above was 18.2 nm, and 75% of fibrous carbons ranged 8~28 nm diameters. The aspect ratio of the fibrous carbon produced above was more than 30.

Example 12

Catalyst prepared as in Example 11 was set in the furnace as described in Example 1. After He flow at ambient temperature for 30 min, the gas mixture of 100 sccm hydrogen/helium (20% hydrogen partial pressure) was introduced at 480° C. for 2 h, and then the reaction was performed under 200 sccm gas flow composed of a 75:25 ethylene:hydrogen (v/v) mixture at 400° C. for 2 h, providing 1573 mg fibrous carbons free from CBs.

The $d002$, $Lc(002)$, surface areas, and average diameters of fibrous carbons produced above were measured by the methods described in Example 1 (Table 3). The structure of fibrous carbons produced above was a columnar type, similar as in Example 2. The average diameters of fibrous carbons produced above were 10.4 nm, and the aspect ratio of the fibrous carbon produced above was more than 30.

Example 13 and 14

Catalyst and reaction condition were the same as in Example 11, but reduction was performed under gas mixture of 100 mL/min hydrogen/helium (20% hydrogen partial pressure) at 480° C. for 7 h (Example 13) and for 4 h (Example 14), providing 4270 mg and 4380 mg fibrous carbons free from CBs, respectively.

The structure of fibrous carbons produced above was a feather type, the same one as in Example 11. The $d002$, $Lc(002)$, surface areas, and average diameters of fibrous carbons produced above were measured by the methods described in Example 1 (Table 3). The aspect ratio of the fibrous carbon produced above in both cases was more than 30.

Examples 15, 16 and 17

Catalyst and reduction condition were the same as in Example 12, but the reaction was performed under 200 sccm gas flow composed of a 75:25 ethylene:hydrogen (v/v) mixture at 430° C. for 1 h (Example 15), at 390° C. for 1 h (Example 16), and at 350° C. for 2 h (Example 17), providing fibrous carbons of 1350 mg, 1050 mg, and 480 mg, respectively.

The $d002$, $Lc(002)$, surface areas, and average diameters of fibrous carbons produced above were measured by the methods described in Example 1 (Table 3). The structure of fibrous carbons produced above was a columnar type, similar as in Example 14. The average diameters of fibrous carbons produced above were 20.6 nm (Example 15), 21.7 nm (Example 16) and 14.4 nm (Example 17), respectively, and the aspect ratio of the fibrous carbons produced above was more than 30.

Examples 18 and 19

Catalyst, reduction condition, and reaction condition were the same as in Example 11, but the carbon sources were differently a 50:50 ethylene:hydrogen (v/v) mixture (Example 18) and a 100:0 ethylene:hydrogen (v/v) mixture (Example 19), providing fibrous carbons of 3620 mg and 1820 mg, respectively.

The $d002$, $Lc(002)$, surface areas, and average diameters of fibrous carbons produced above were measured by the methods described in Example 1 (Table 3). The structure of fibrous carbons produced above was similar as in Example 17. The average diameters of fibrous carbons produced above were 13.7 nm (Example 18) and 22.8 nm (Example 19), respectively, and the aspect ratio of the fibrous carbons produced above was more than 30.

Example 20

Catalyst, reduction condition and reaction condition were the same as in Example 10, except that reaction temperature was 500° C., providing 3024 mg fibrous carbons.

The $d002$, $Lc(002)$, surface areas, and average diameters of fibrous carbons produced above were measured by the methods described in Example 1 (Table 3). The structure of fibrous carbons produced above was a feather type. The average diameters or widths of the fibrous carbons were measured by observation of 320 million magnified images through TEM monitor in random selection of 500 fibrous carbons. The average diameter of the fibrous carbon produced above was 23.4 nm, and 75% of fibrous carbons ranged 10~25 nm diameters. The aspect ratio of the fibrous carbon produced above was more than 30.

Example 21

CB-supported Ni was prepared from nickel nitrate according to the preparation procedure as described in Example 1. Metal content was 5% in CB-supported Ni.

CB from CB-supported Ni as prepared above was combusted in dry air at 100 sccm flow rate composed of 20 v/v % oxygen and 80 v/v % nitrogen at 450° C. for 5 h, providing a Ni oxide containing less than 1.0 wt % CB content. After He flow at ambient temperature for 30 min, Ni oxide as prepared above was reduced in the gas mixture of 100 sccm hydrogen/helium (20% hydrogen partial pressure) at 480° C. for 1 h. After cooling down to ambient temperature, passivation was performed by exposure to 2 v/v % oxygen in helium (flow rate 100 scam) for 30 min, providing a Ni catalyst free from CBs.

Ni catalyst as prepared above (30 mg) was set in the furnace as described in Example 1. After He flow at ambient temperature for 30 min, the gas mixture of 100 sccm hydrogen/helium (20% hydrogen partial pressure) was introduced at 480° C. for 2 h, and then the reaction was performed under 200 scam gas flow composed of a 75:25 ethylene:hydrogen (v/v) mixture at 480° C. for 2 h, providing 320 mg fibrous carbons free from CBs.

The $d002$, $Lc(002)$, surface areas, and average diameters of fibrous carbons produced above were measured by the methods described in Example 1 (Table 3). The fibrous carbons as prepared above shows a feather structure wherein the hexagonal planes align angled to the fibrous carbon axis, distinct from carbon nanotube as described above.

The average diameters or widths of the fibrous carbons were measured by observation of 320 million magnified images through TEM monitor in random selection of 500 fibrous carbons. The average diameter of the fibrous carbon produced above was 29.0 nm. The aspect ratio of the fibrous carbon produced above was more than 30.

TABLE 3

| | X-ray diffraction properties | | $N_2$ BET | |
|---|---|---|---|---|
| | $d_{002}$ (nm) | Lc (002) (nm) | surface area ($m^2/g$) | Diameter (nm) |
| Example 11 | 0.3441 | 4.7 | 286 | 18.2 |
| Example 12 | 0.3444 | 4.7 | 510 | 10.4 |
| Example 13 | 0.3446 | 4.6 | 580 | 8.4 |
| Example 14 | 0.3448 | 4.4 | 220 | 17.6 |
| Example 15 | 0.3463 | 3.5 | 266 | 20.6 |
| Example 16 | 0.3470 | 3.2 | 279 | 21.7 |
| Example 17 | 0.3477 | 2.8 | 391 | 14.4 |
| Example 18 | 0.3490 | 2.2 | 410 | 13.7 |
| Example 19 | 0.3501 | 2.3 | 220 | 22.8 |
| Example 20 | 0.3488 | 3.1 | 230 | 23.4 |
| Example 21 | 0.3520 | 2.0 | 214 | 29.0 |
| C-example* 6 | 0.3551 | 1.8 | 141 | 220.5 |
| C-example 7 | 0.3512 | 2.0 | 139 | 180.7 |
| C-example 8 | 0.3488 | 2.2 | 123 | 104.5 |
| C-example 9 | 0.3555 | 1.6 | 182 | 88.9 |

*C-example is the abbreviation of 'Comparative example'

Ultra-fine fibrous carbons in this invention, which is different from conventional filamentous nanocarbons or carbon nanofibers, have very small diameters of 5~50 nm simultaneously with a graphitic structure. Therefore, the fibrous carbon of this invention is expected as a superior material for practical applications such as transparent conductive composites; transparent electromagnetic shields; lithium secondary battery, EDLC, and air cells; catalyst supports for fuel cells or organic reactions; electrification blocks for solar cells; electric desalination electrodes; gas storage; isotope separator; and removal of $SO_x$ or $NO_x$.

Comparative examples below, which describe filamentous nanocarbons or carbon fibers over catalysts by conventional coprecipitation, may support the originality of ultra-fine fibrous carbons in this invention.

Comparative Example 1

Fe/Ni (1/4) alloy catalyst was prepared by dissolving 29.0 g iron nitrate and 5.0 g nickel nitrate in 200 ml distilled water. To this solution, while rapidly stirred at room temperature, powdered ammonium bicarbonate was added until a permanent turbidity formed, and then there was added rapidly ammonium bicarbonate. After stirring for 10 min, the precipitate settled for 8 h, and then was washed with distilled water by two times and then with ethanol by one time. The filtered precipitate was dried in a vacuum oven at 80° C. for 8 h. The dry precipitate above was set in the furnace as described in Example 1, and then was calcined in dry air at 100 sccm flow rate composed of 20 v/v % oxygen and 80 v/v % nitrogen at 400° C. for 5 h, resulting in Fe/Ni (1/4) oxide. Fe/Ni (1/4) oxide as prepared above was reduced in a hydrogen:helium mixture (20% hydrogen partial pressure) of 100 sccm flow rate at 500° C. for 20 h, and then, after cooling to room temperature, was passivated by 5 v/v % oxygen in helium (flow rate 100 sccm) for 30 min, providing a Fe/Ni (1/4) alloy catalyst.

Figure 5:
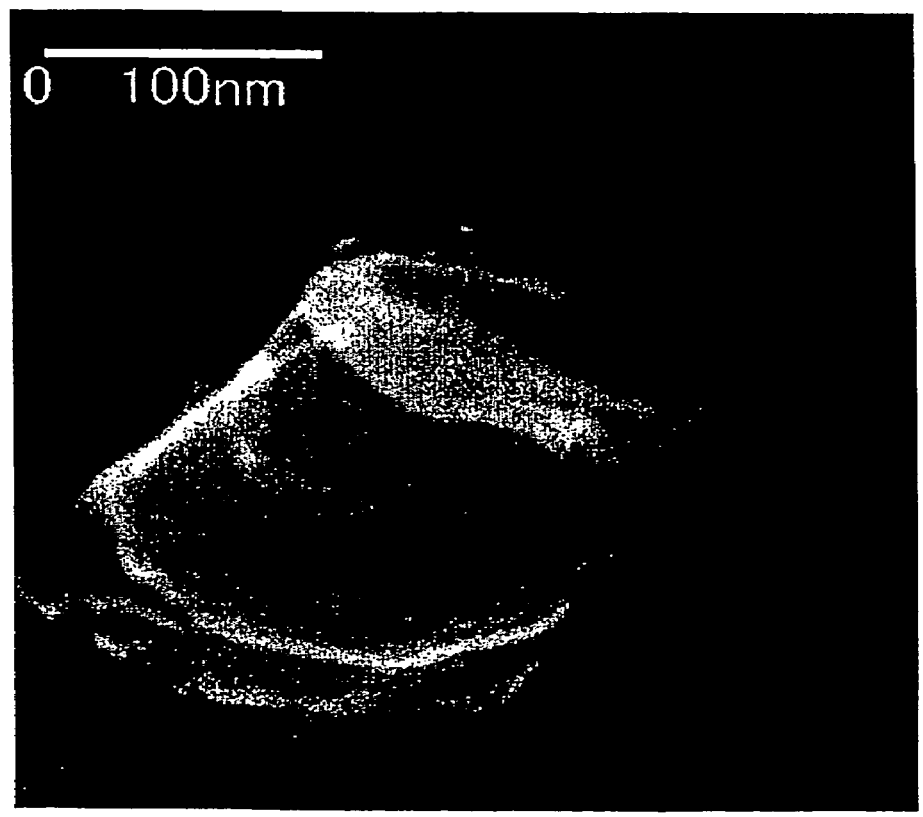
FIGS. 5, 6a and 6b illustrate HR-SEM and HR-TEM photographs of the present ultra-fine fibrous carbons produced in Comparative Example 1.
Figure 6A:
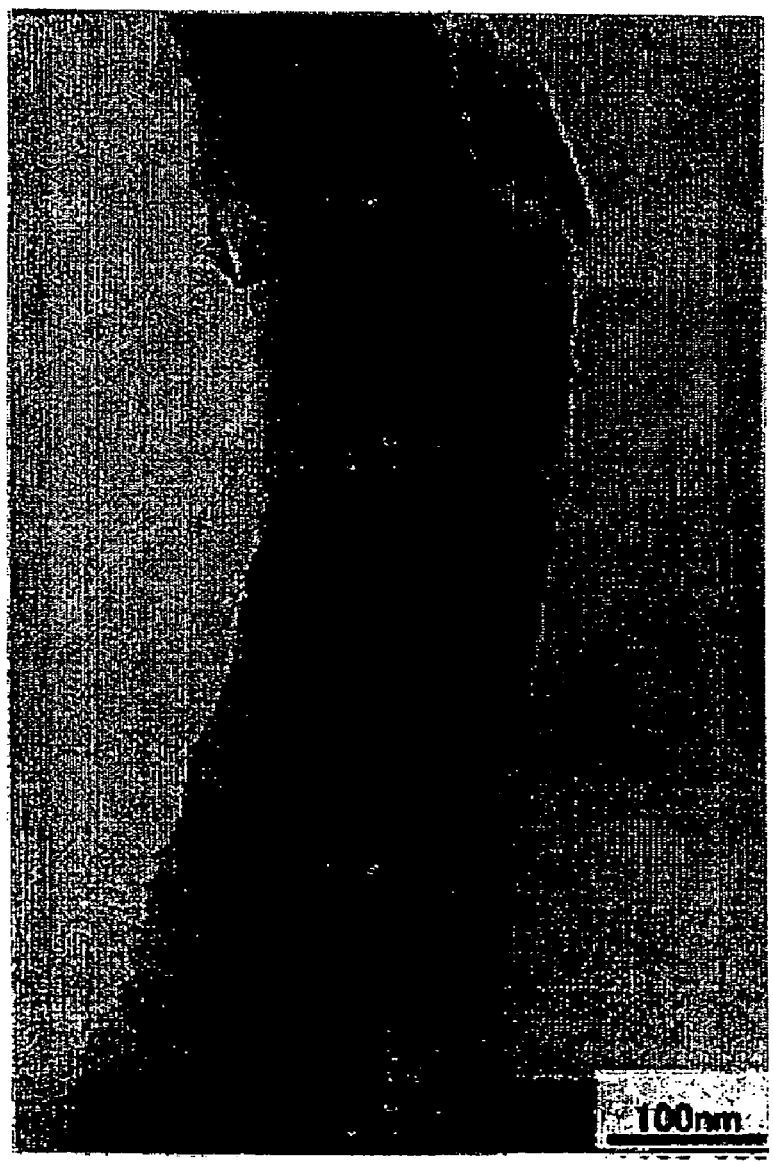
Figure 6B:
Figure 7:
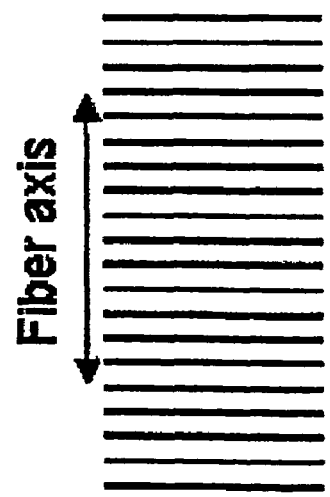
FIG. 7 shows a 2-dimensional structural model of platelet or columnar filamentous nanocarbons.
Figure 8:
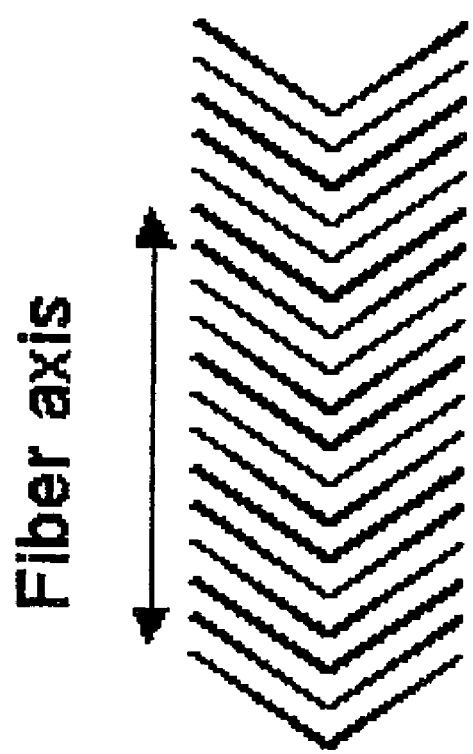
FIG. 8 shows a 2-dimensional structural model of herringbone or feather filamentous nanocarbons.

Fe/Ni (1/4) in this comparative example (30 mg) was set in the furnace as described in Example 1. After He flow at ambient temperature for 30 min, the gas mixture of 100 sccm hydrogen/helium (20% hydrogen partial pressure) was introduced at 540° C. for 2 h, and then the reaction was performed under 200 sccm gas flow composed of a 75:25 ethylene:hydrogen (v/v) mixture at 540° C. for 2 h, providing 1410 mg fibrous carbons. The d002, Lc(002), and surface area of fibrous carbons produced above were measured by the methods described in Example 1 (Table 2). The morphology and structure of ultra-fine fibrous carbons produced above were examined under a high resolution scanning electron microscope (HR-SEM, Jeol, JSM 6403F) and a transmission electron microscope (TEM, Jeol, JEM 100CX) as shown in FIGS. 5, 6a and 6b. The fibrous carbons as prepared above show a columnar structure wherein the hexagonal planes align perpendicular to the fiber axis, distinct from carbon nanotubes which have the hexagonal plane alignment parallel to the fiber axis with a continuous hollow core.

However, the average diameter of the fibrous carbon produced above was 140.3 nm, and many fibrous carbons were found to have actually more than 300 nm diameters, which is much thicker than ultra-fine fibrous carbons in this invention.

Comparative Examples 2 and 3

Catalyst as in Comparative example 1 was used, and, after He flow at ambient temperature for 30 min, the gas mixture of 100 sccm hydrogen/helium (20% hydrogen partial pressure) was introduced at 480° C. for 2 h, and then the reaction was performed under 200 sccm gas flow composed of a 50:50 ethylene:hydrogen (v/v) mixture at 430° C. for 2 h (Comparative example 2) and at 600° C. for 1 h, providing 1620 mg of fibrous carbons.

Fibrous carbon produced in Comparative example 3 was examined on the d002, Lc(002), surface area, and average diameter by the methods described in Example 1 (Table 2). The fibrous carbons as prepared above show a columnar structure wherein the hexagonal planes align perpendicular to the fiber axis, distinct from carbon nanotubes which have the hexagonal plane alignment parallel to the fiber axis. However, the average diameter of the fibrous carbon produced above was 164.4 nm, and many fibrous carbons were found to have actually more than 300 nm diameters, and the aspect ratio of many fibrous carbons was more than 10.

Comparative Example 4

Catalyst, reduction condition and reaction gases were the same as in Comparative example 3, except that reaction temperature and time were 680° C. and 1 h, providing 330 mg fibrous carbons. During the reaction, a lot of yellowish compounds were adsorbed on inner surface of both ends of the quartz tube, suggesting active thermal decomposition of ethylene forming amorphous carbons, and the yellowish compounds were proved as relatively high molecular hydrocarbons by post-analysis.

Fibrous carbon produced above was examined on the d002, Lc(002), surface area, and average diameter by the methods described in Example 1 (Table 2). The average diameter of the fibrous carbon produced above was 130.8 nm, and many fibrous carbons were found to have actually more than 300 nm diameters, and the aspect ratio of many fibrous carbons was more than 10.

Comparative Example 5

A Fe/Ni (8/2 w/w) alloy catalyst was prepared from iron nitrate, nickel nitrate and ammonium bicarbonate according to the preparation procedure as described in Comparative example 1.

Fe/Ni (8/2) as prepared above (30 mg) was set in the furnace as described in Example 1. After He flow at ambient temperature for 30 min, the gas mixture of 100 sccm hydrogen/helium (20% hydrogen partial pressure) was introduced at 600° C. for 2 h, and then the reaction was performed under 200 sccm gas flow composed of a 75:25 CO:hydrogen (v/v) mixture at 600° C. for 2 h, providing 1820 mg fibrous carbons.

The fibrous carbon as prepared above shows a feather structure wherein the hexagonal planes align angled to the fibrous carbon axis, distinct from carbon nanotubes which have the hexagonal plane alignment parallel to the fiber axis. The average diameter of the fibrous carbon produced above was 150.6 nm, and many fibrous carbons were found to have actually more than 300 nm diameters, and the aspect ratio of many fibrous carbons was more than 10.

The fibrous carbons as prepared above show a columnar structure wherein the hexagonal planes align perpendicular to the fiber axis, distinct from carbon nanotubes which have the hexagonal plane alignment parallel to the fiber axis.

Comparative Example 6

A Fe/Ni (614 w/w) alloy catalyst was prepared from iron nitrate, nickel nitrate and ammonium bicarbonate according to the preparation procedure as described in Comparative example 1.

Fe/Ni (6/4) as prepared above (30 mg) was set in the furnace as described in Example 1. After He flow at ambient temperature for 30 min, the gas mixture of 100 sccm hydrogen/helium (20% hydrogen partial pressure) was introduced at 480° C. for 2 h, and then the reaction was performed under 200 sccm gas flow composed of a 50:50 ethylene:hydrogen (v/v) mixture at 600° C. for 1 h, providing 940 mg fibrous carbons.

Fibrous carbon produced above was examined on the d002, Lc(002), surface area, and average diameter by the methods described in Example 1 (Table 3). The fibrous carbon as prepared above shows a feather structure, similar as in Comparative example 1.

The average diameter of the fibrous carbon produced above was 220.5 nm, and very many fibrous carbons were found to have actually more than 300 nm diameters. The aspect ratio was more than 10.

Comparative Example 7

A Ni catalyst was prepared from iron nitrate, and ammonium bicarbonate according to the preparation procedure as described in Comparative example 1.

Ni catalyst as prepared above (30 mg) was set in the furnace as described in Example 1. After He flow at ambient temperature for 30 min, the gas mixture of 100 sccm hydrogen/helium (20% hydrogen partial pressure) was introduced at 480° C. for 2 h, and then the reaction was performed under 200 sccm gas flow composed of a ethylene:hydrogen mixture (50% hydrogen partial pressure) at 600° C. for 1 h, providing 940 mg fibrous carbons.

Fibrous carbon produced above was examined on the d002, Lc(002), surface area, and average diameter by the methods described in Example 1 (Table 3). The fibrous carbon as prepared above shows a feather structure, similar as in Comparative example 1.

The average diameter of the fibrous carbon produced above was 180.7 nm, and fibrous carbons of more than 300 nm diameters were considerably found in the product. The aspect ratio was more than 10.

Comparative Example 8

Catalyst as in Example 1 was used, and, after He flow at ambient temperature for 30 min, the gas mixture of 100 sccm hydrogen/helium (20% hydrogen partial pressure) was introduced at 600° C. for 2 h, and then the reaction was performed under 200 sccm gas flow composed of a 75:25 ethylene:hydrogen (v/v) mixture at 600° C. for 2 h, providing 2856 mg fibrous carbons.

Fibrous carbon produced above was examined on the d002, Lc(002), surface area, and average diameter by the methods described in Example 1 (Table 3).

To examine the morphology of fibrous carbons as prepared above, SEM (Jeol, JSM 6403F) was used. The structure of fibrous carbons as prepared above was of a herring bone type, wherein the hexagonal planes align angled to the fiber axis (Rodriguez, N. M. 1993. *J. Mater. Res.* 8: 3233), differing from the carbon nanotubes.

The average diameter of the fibrous carbon produced above was 104.5 nm, and more than 60% of fibrous carbons ranged 80~150 nm diameters. Thin fibrous carbons as prepared above tended to have spiral structure like a coil, and a majority of the fibrous carbons were of the mixture of branched one, helical one (modified coil type), and straight fibrous carbon. The aspect ratio was more than 10.

Comparative Example 9

Silica-supported Fe/Ni mixture or alloy (1/4 w/w) catalyst was prepared as follows. The mixture of 29.0 g iron nitrate and 5.0 g nickel nitrate was dissolved in 200 ml distilled water, and then fumed silica 80 g was added to the solution, the mixture being stirred for 30 min. The slurry was dried in a rotary evaporator at 80° C. under 40 torr, providing a silica-supported Fe/Ni (1/4) catalyst (5% metal content per silica).

Silica-supported Fe/Ni(1/4) as prepared above (110 mg) was dispersed in a quartz tray (length:width:depth=100:25:15/mm (outer)), and then the tray was placed in the middle of a quartz tube (45 mm inner diameter), which was equipped with a conventional furnace. After He flow at ambient temperature for 30 min, the gas mixture of 100 sccm hydrogen/helium (20% hydrogen partial pressure) was introduced at 600° C. for 2 h, and then the reaction was performed under 200 sccm gas flow composed of a 75:25 ethylene:hydrogen (v/v) mixture at 600° C. for 2 h, providing 2856 mg fibrous carbons containing silica.

The surface areas of the fibrous carbons were calculated by using the Dubinin equation from $N_2$ isotherm (the BET method), given in Table 3.

The morphology and structure of ultra-fine fibrous carbons produced above were examined under a high resolution scanning electron microscope (HR-SEM, Jeol, JSM 6403F), and the fibrous carbon as prepared above shows a Herringbone structure wherein the hexagonal planes align angled to the fibrous carbon axis (Rodriguez, N. M. *J. Mater. Res.* 8: 3233 (1993)), distinct from carbon nanotube of which the hexagonal planes align parallel to the fiber axis.

The average diameters or widths of the fibrous carbons were measured by observation of 320 million magnified images through TEM monitor in random selection of 500 fibrous carbons. The average diameter of the fibrous carbon produced above was 88.9 nm, and 60% of fibrous carbons ranged 80~150 nm diameters. Thin fibrous carbons as prepared above tended to have spiral structure like a coil, and a majority of the fibrous carbons were of the mixture of branched one, helical one (modified coil type), and straight fibrous carbon. The aspect ratio was more than 10.

INDUSTRIAL APPLICABILITY

As described above, the ultra-fine fibrous carbon and preparation method thereof in the present invention can provide fibrous carbons of 5~50 nm diameters with no continuous hollow core which have been known to be very difficult to achieve. This ultra-fine fibrous carbon can be used as a superior material such as ink additives, film materials, polymer composites, and electromagnetic shields, especially wherein the transparency of such products can be attained and controlled by adjusting the addition content of the ultra-fine fibrous carbons. Furthermore, this ultra-fine fibrous carbon can be used as a superior material such as a superior material for a catalyst support of fuel cells and organic reaction, a gas storage medium of hydrogen or methane, and a catalyst or catalyst support for removal of NOx and SOx.

What is claimed is:

1. A method for producing a fibrous carbon characterized by stacking of carbon hexagonal planes having one or double directional growth axis, wherein
    (1) carbon content is more than 95 wt %;
    (2) the diameters range from 3.5 to 79.0 nm;
    (3) the aspect ratio (length per diameter) is more than 20; and (4) the carbon hexagonal planes align perpendicular to the fiber axis with no continuous hollow core therein, the method comprising:

using carbon black-supported metal mixture or alloy catalysts, wherein the metal mixtures or alloys comprise nickel as a major catalyst, and iron or molybdenum as secondary metals; the carbon black is characterized by less than 100 $m^2$/g BET-surface area, 20-60 nm particle size, and more than 10 wt % oxygen content; and the carbon black-supported catalyst contains 0.1-60 wt % metal mixture or alloy per carbon black; and reducing the catalyst 1-3 times in a furnace in gas containing 5-40 v/v % hydrogen in inert gases such as nitrogen, argon or helium at 400-500° C. for 1-48 h; and introducing a carbon source into a furnace at the flow rate of 0.5-40 sccm per 1 mg catalyst, where the carbon source comprises hydrocarbons containing 2-6 carbon atoms or mixtures of aforementioned hydrocarbons and hydrogen.

2. A method according to claim 1, wherein the mixture of hydrocarbons and hydrogen contains between 0-80 v/v % hydrogen;

the production temperature is selected between 300-499° C.; and the production time is selected between 2 min-12 h.

3. A method according to claim 1, further comprising:

oxidizing the carbon black-supported catalyst to contain less than 1 wt % carbon black at 300-500° C. in oxidative gas containing 5-40v/v % oxygen or carbon dioxide in inert gases such as nitrogen, argon or helium.

4. A method according to claim 3, wherein said alloy is composed of 0.1/0.9-0.95/0.05 (wt/wt) of Ni/Fe; 0.05/0.95-0.95/0.05 (wt/wt) of Ni/Co; and 0.1/0.9-0.9/0.1 (wt/wt) of Ni/Mo.

* * * * *